US012251798B2

(12) United States Patent
Rahman et al.

(10) Patent No.: US 12,251,798 B2
(45) Date of Patent: Mar. 18, 2025

(54) HAND-HELD POWER TOOL AND METHOD FOR ACTIVATING A DRIVE MOTOR OF A HAND-HELD POWER TOOL

(71) Applicant: Robert Bosch GmbH, Stuttgart (DE)

(72) Inventors: Khiri Abd Rahman, Kedah (MY); Ying Xuan Tan, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 527 days.

(21) Appl. No.: 17/667,250

(22) Filed: Feb. 8, 2022

(65) Prior Publication Data

US 2022/0250213 A1 Aug. 11, 2022

(30) Foreign Application Priority Data

Feb. 9, 2021 (DE) ..................... 10 2021 201 181.0

(51) Int. Cl.
*B25B 21/00* (2006.01)
*B25F 5/02* (2006.01)

(52) U.S. Cl.
CPC ................ *B25B 21/00* (2013.01); *B25F 5/02* (2013.01)

(58) Field of Classification Search
CPC ....... B25B 12/46; B25B 13/466; B25B 17/00; B25B 15/00; B25B 23/14; B25F 5/00; B25F 5/01; B23B 45/008; B25D 2250/301; B23Q 5/28; B23Q 5/08; B23Q 5/147; B23Q 5/167; B25Q 5/08
See application file for complete search history.

(56) References Cited

U.S. PATENT DOCUMENTS

| | | | | |
|---|---|---|---|---|
| 4,442,738 A * | 4/1984 | Spencer | B25B 23/145 81/474 |
| 4,617,843 A * | 10/1986 | Nishida | B25B 23/147 81/429 |
| 5,557,990 A | 9/1996 | Shin | |
| 2011/0030981 A1 | 2/2011 | Totsu | |
| 2012/0241183 A1* | 9/2012 | Li | B25B 21/00 173/48 |

FOREIGN PATENT DOCUMENTS

| | | |
|---|---|---|
| DE | 10 2012 218 272 A1 | 4/2014 |
| DE | 20 2019 104 987 U1 | 10/2019 |
| EP | 1 369 206 A1 | 12/2003 |

* cited by examiner

*Primary Examiner* — Michelle Lopez
(74) *Attorney, Agent, or Firm* — Maginot, Moore & Beck LLP

(57) ABSTRACT

A hand-held power tool includes a tool holder, a housing in which a drive motor configured to drive an output shaft is arranged, the output shaft arranged spaced apart from the tool holder in a decoupling position of the tool holder, and a clutch configured to operatively connect the output shaft to the tool holder in a coupling position of the tool holder by way of a loading of the tool holder along a rotational axis of the drive motor against a workpiece to be worked on. An actuating rod is configured to be loaded against a motor switch in the coupling position to activate the drive motor, the motor switch arranged along the rotational axis of the drive motor between the drive motor and the clutch, wherein the actuating rod is guided by the housing at least in regions.

14 Claims, 5 Drawing Sheets

HAND-HELD POWER TOOL AND METHOD FOR ACTIVATING A DRIVE MOTOR OF A HAND-HELD POWER TOOL

This application claims priority under 35 U.S.C. § 119 to patent application no. DE 10 2021 201 181.0, filed on Feb. 9, 2021 in Germany, the disclosure of which is incorporated herein by reference in its entirety.

BACKGROUND

The present disclosure relates to a hand-held power tool, in particular a screwdriver, with a tool holder and a housing, in which a drive motor for driving an output shaft is arranged.

A hand-held power tool of this type which is configured as a screwdriver is known from the prior art. In the housing, the screwdriver has a drive motor for driving an associated tool holder. An activation of the drive motor or of a switching element which is assigned to the drive motor takes place by way of loading of an insertable tool, arranged in the tool holder, against a workpiece to be worked on. An actuating rod is arranged in a central inner holder of the tool holder in order to actuate the switching element.

SUMMARY

The disclosure relates to a hand-held power tool, in particular a screwdriver, with a tool holder and a housing, in which a drive motor for driving an output shaft is arranged, the output shaft being arranged spaced apart from the tool holder in a decoupling position of the tool holder, and the output shaft being operatively connected to the tool holder via a clutch in a coupling position of the tool holder, by way of loading of the tool holder, in particular along a rotational axis of the drive motor, against a workpiece to be worked on, an actuating rod being loaded against a motor switch in the coupling position in order to activate the drive motor, and the motor switch being arranged along a rotational axis of the drive motor between the drive motor and the clutch. The actuating rod is guided along on the housing at least in regions.

The disclosure therefore makes the provision of a hand-held power tool possible, in the case of which a secure and reliable activation of the drive motor can be made possible in the coupling position by way of the actuating rod being guided along on the housing at least in regions.

The actuating rod is preferably connected via a slide to the tool holder.

Therefore, actuating of the motor switch in the coupling position and spacing apart of the actuating rod from the motor switch in the decoupling position can be made possible in a simple way.

The slide is preferably decoupled in terms of rotation from the tool holder via a bearing element.

Therefore, easy and uncomplicated decoupling in terms of rotation of the slide from the tool holder can be made possible.

In accordance with one embodiment, the slide has a holder for receiving an end of the actuating rod, which end faces the tool holder.

Therefore, a secure and reliable arrangement of the actuating rod on the slide can be made possible.

The slide preferably has a positioning web, the positioning web being configured to position the slide in the housing such that it cannot rotate.

Therefore, an anti-rotation safeguard of the slide in the housing can be made possible in a simple way.

The clutch preferably has a first clutch part which is connected to the tool holder and a second clutch part which is connected to the output shaft, the first and second clutch part being in engagement with one another in the coupling position, and being spaced apart from one another along the rotational axis of the drive motor in the decoupling position.

Therefore, activating of the drive motor by way of loading of the tool holder against a workpiece to be worked on can be made possible securely and reliably.

The slide is preferably arranged on an outer circumference of the first clutch part.

Therefore, a suitable arrangement of the slide can be made possible in a simple way.

In accordance with one embodiment, one end, facing the motor switch, of the actuating rod is spaced apart from the motor switch in the decoupling position, and the motor switch is activated by way of force loading in the coupling position.

Therefore, an auto-start mode of the hand-held power tool can be made possible in an easy and uncomplicated manner.

The clutch is preferably configured as a separating clutch, in particular as a dog clutch.

Therefore, a robust and stable clutch can be provided.

Moreover, the present disclosure provides a method for activating a drive motor of a hand-held power tool. The method has the following steps:

- activating of an operating element of the hand-held power tool,
- activating of an auto-start mode via an operating element of an auto-start unit of the hand-held power tool, and
- loading of the tool holder of the hand-held power tool against a workpiece to be worked on, a clutch part of the output shaft being operatively connected to a clutch part of the tool holder by way of a movement along a rotational axis of the drive motor, as a result of which the actuating rod is displaced along the rotational axis of the drive motor and activates the motor switch.

BRIEF DESCRIPTION OF THE DRAWINGS

The disclosure is described in greater detail in the following description on the basis of exemplary embodiments which are illustrated in the drawings, in which.

DETAILED DESCRIPTION

In the figures, elements with an identical or comparable function are provided with identical reference signs and will be described more precisely only once.

Figure 1:
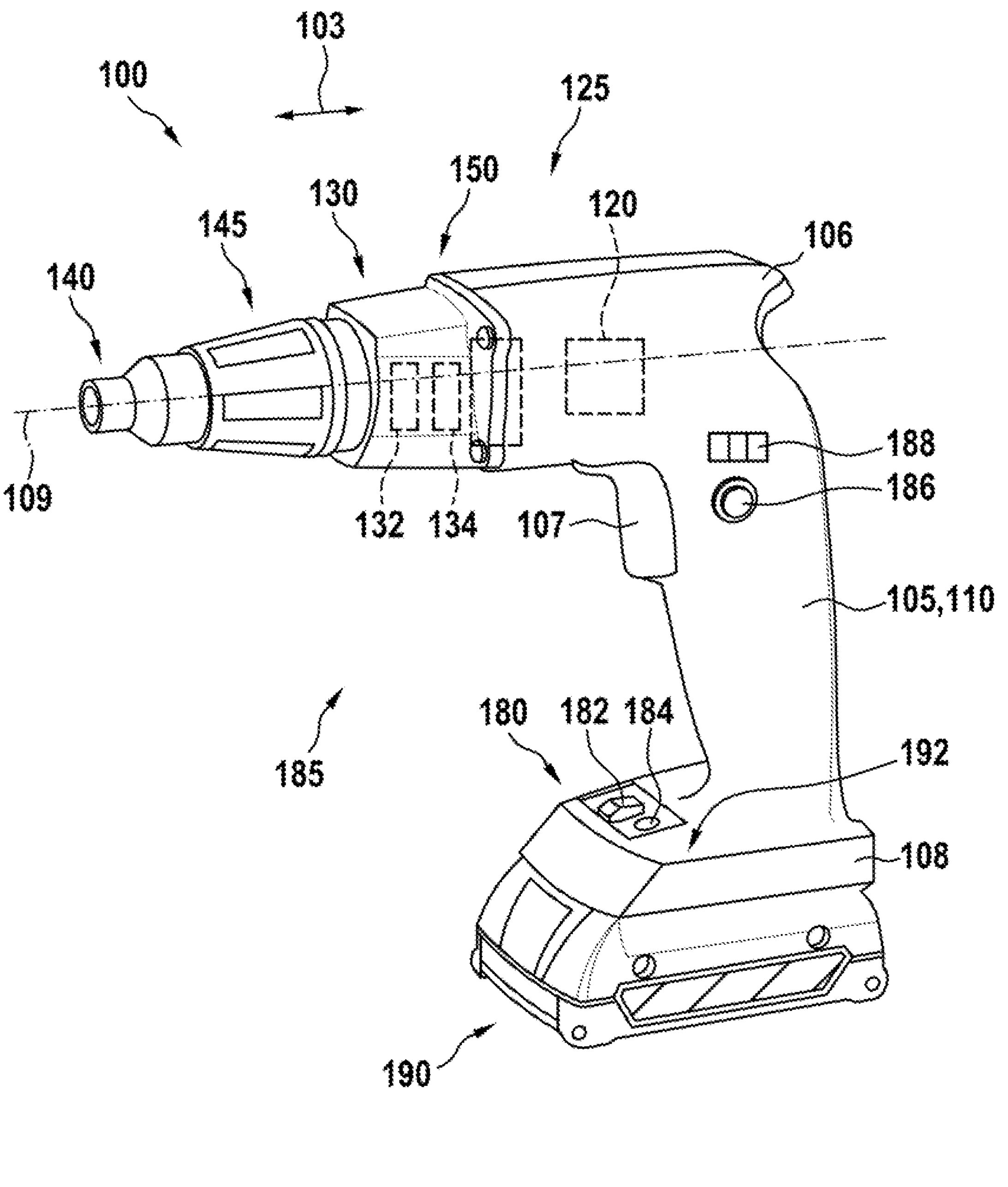
FIG. 1 shows a perspective view of a hand-held power tool according to the disclosure with an activating unit which has an auto-start unit.

FIG. 1 shows a hand-held power tool 100, configured by way of example as a screwdriver, in particular as a dry wall screwdriver, with a housing 110. The housing 110 is preferably of pistol-shaped configuration, with a handle 105 which connects an upper (in the illustration) housing section 106 to a lower (in the illustration) housing section 108. In the illustration, the upper and lower housing section 106, 108 are oriented at least approximately parallel to one another and perpendicularly with respect to the handle 105. A drive unit 125 is preferably arranged in the upper housing section 106, and a rechargeable battery pack 190 is preferably arranged on the lower housing section 108.

It is noted that the hand-held power tool 100 can also be configured without a lower housing section 108, it being possible for the rechargeable battery pack 190 to be arranged at least in sections in the handle 105. As an alternative to this, for example, a power cable for power supply-dependent power supply can also be provided instead of a power supply-independent power supply via the rechargeable battery pack 190.

In order to activate the drive unit 125, the handle 105 is assigned by way of example an operating element 107. Furthermore, a locking element 186 is optionally provided on the handle 105, which locking element 186 is configured to lock or to block the operating element 107 in an associated operating position after an operation. Moreover, a rotational direction switch 188 is provided by way of illustration, which rotational direction switch 188 is configured to activate a rotational direction of the drive unit 125 or a reversing mode of the drive unit 125.

The drive unit 125 preferably has at least one drive motor 120. A rotational axis 109 of the drive motor 120 forms by way of illustration a longitudinal direction 103 of the housing 110, in particular of the upper housing section 106.

In accordance with one embodiment, the drive unit 125 is assigned at least one clutch 132. The drive unit 125 can optionally be assigned a transmission unit 130. The optional transmission unit 130 comprises, for example, a transmission 134, in particular a planetary transmission.

The transmission unit 130 and the drive motor 120 are preferably arranged along the longitudinal direction 103 or in the axial direction. In the present description, the term "axial" or "in the axial direction" is generally to be understood to mean a direction along the longitudinal direction 103 of the housing 110, in particular a direction which is coaxial or parallel with respect to the rotational axis 109 of the drive motor 120.

The drive motor 120 is preferably configured to drive a tool holder 140. The tool holder 140 is preferably assigned an inner holder for receiving an insertable tool, for example a screwdriver bit or a drill. In particular, the drive motor 120 preferably drives an output shaft (295 in FIG. 2) which in turn drives a drive shaft (298 in FIG. 2) which is connected to the tool holder 140.

An optional torque adjusting sleeve 145 is arranged along the rotational axis 109, preferably between the tool holder 140 and the drive motor 120 or the optional transmission unit 130. The torque adjusting sleeve 145 is preferably configured for adjusting a torque.

Moreover, the clutch 132 is arranged along the rotational axis 109 by way of illustration between the drive motor 120, in particular the output shaft (295 in FIG. 2), and the tool holder 140. In accordance with one embodiment, the clutch 132 is configured as a separating clutch, in particular as a dog clutch.

Figure 2:
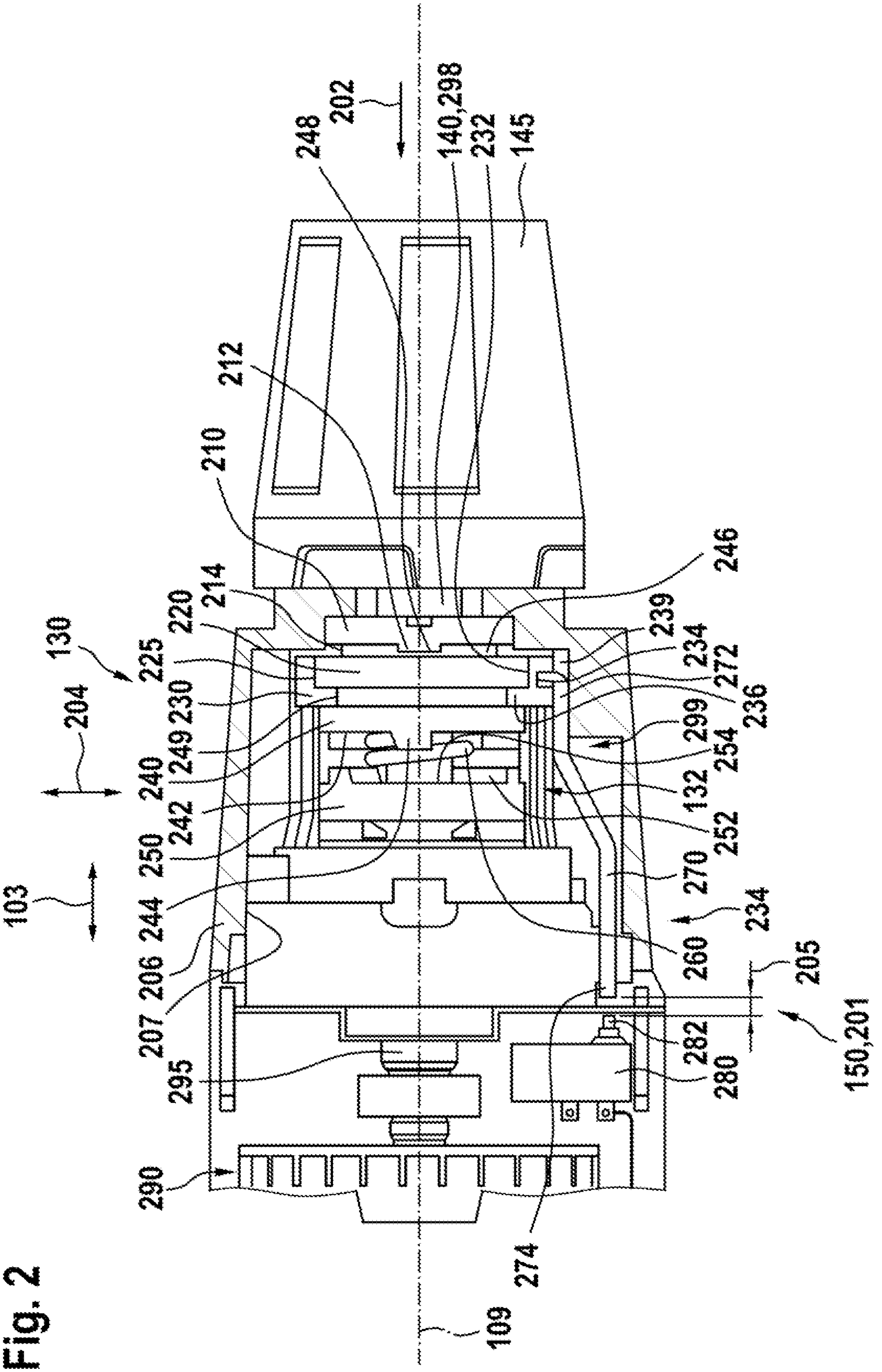
FIG. 2 shows a top view of the auto-start unit from FIG. 1 with a clutch in a decoupling position in the case of an open housing of the hand-held power tool from FIG. 1.

In a decoupling position (201 in FIG. 2) of the tool holder 140, the output shaft (295 in FIG. 2) is arranged spaced apart from the tool holder 140 and, in a coupling position (301 in FIG. 4) of the tool holder 140, the tool holder 140 is operatively connected to the output shaft (295 in FIG. 2). The tool holder 140 is arranged in the coupling position (301 in FIG. 4) by way of loading of the tool holder 140, in particular along the rotational axis 109, against a workpiece to be worked on.

In the coupling position (301 in FIG. 4), the drive motor 120 is preferably activated by way of an activating unit 185. The activating unit 185 is preferably assigned an auto-start unit 150 of the hand-held power tool 100.

An operating unit 180 is preferably provided in order to activate an auto-start mode of the hand-held power tool 100 via the auto-start unit 150. By way of illustration, the operating unit 180 is arranged on an upper side 192 of the second housing section 108. Here, the operating unit 180 is arranged so as to face the first housing section 106. The operating unit 180 can also be arranged, however, at any desired different location of the hand-held power tool 100.

By way of illustration, the operating unit 180 has an operating element 182 for activating the auto-start mode. The operating element 182 is preferably configured as a button. Furthermore, the operating unit 180 is assigned a display 184 at least for visualizing an activation of the auto-start mode. To this end, the display 184 can have, for example, an LED which lights up or blinks in the case of an activation of the auto-start mode. As an alternative, an activation of the auto-start mode can also take place via an external device, for example a smartphone.

The hand-held power tool 100 can preferably be operated in the auto-start mode or in a manual mode. In the manual mode, a user of the hand-held power tool 100 actuates the operating element 107, as a result of which the drive motor 120 is activated. By way of loading of the tool holder 140 along the rotational axis 109 against a workpiece to be worked on, the tool holder 140 is arranged in the coupling position (301 in FIG. 4), and the tool holder 140 rotates.

In order to activate the auto-start mode, the operating element 107 is preferably actuated, and the auto-start mode is subsequently activated via an actuation of the operating element 182 of the operating unit 180. Here, however, the drive motor 120 is initially not activated. By way of subsequent loading of the tool holder 140 along the rotational axis 109 against a workpiece to be worked on, the tool holder 140 is arranged in the coupling position (301 in FIG. 4), as a result of which an actuating rod (270 in FIG. 2) activates a motor switch (280 in FIG. 2). The drive motor 120 is then activated, and the tool holder 140 rotates.

FIG. 2 shows the auto-start unit 150, arranged in the housing 110, of the hand-held power tool 100 from FIG. 1 in a decoupling position 201 of the tool holder 140. By way of example, the auto-start unit 150 is arranged in a transmission housing 206. The transmission housing 206 has an inner holder 207. Here, at least the clutch 132 with the auto-start unit 150 is arranged in the inner holder 207.

The drive motor 120 from FIG. 1 preferably drives an output shaft 295. In accordance with one embodiment, the clutch 132 has a first clutch part 240 which is connected to the tool holder 140 and a second clutch part 250 which is connected to the output shaft 295. The first clutch part 240 is preferably connected fixedly to the tool holder 140 for conjoint rotation, in particular to a drive shaft 298 which is assigned to the tool holder 140, and the second clutch part 250 is connected fixedly to the output shaft 295 for conjoint rotation.

The first and second clutch part 240, 250 are preferably configured in each case in the manner of a crown disk. Here, the first clutch part 240 has web-shaped holder elements 244 and groove-like holders 242 which are configured so as to face the second clutch part 250. In an analogous manner with respect thereto, the second clutch part 250 has web-shaped holder elements 252 and groove-like holders 254 which are configured so as to face the first clutch part 240. The holders 242, 254 and the holder elements 244, 252 are arranged here on mutually facing side faces of the first and second clutch part 240, 250. The holders 242, 254 and the holder elements 244, 252 are preferably arranged on the first and second clutch part 240, 250 distributed uniformly in the circumferential direction.

Figure 4:
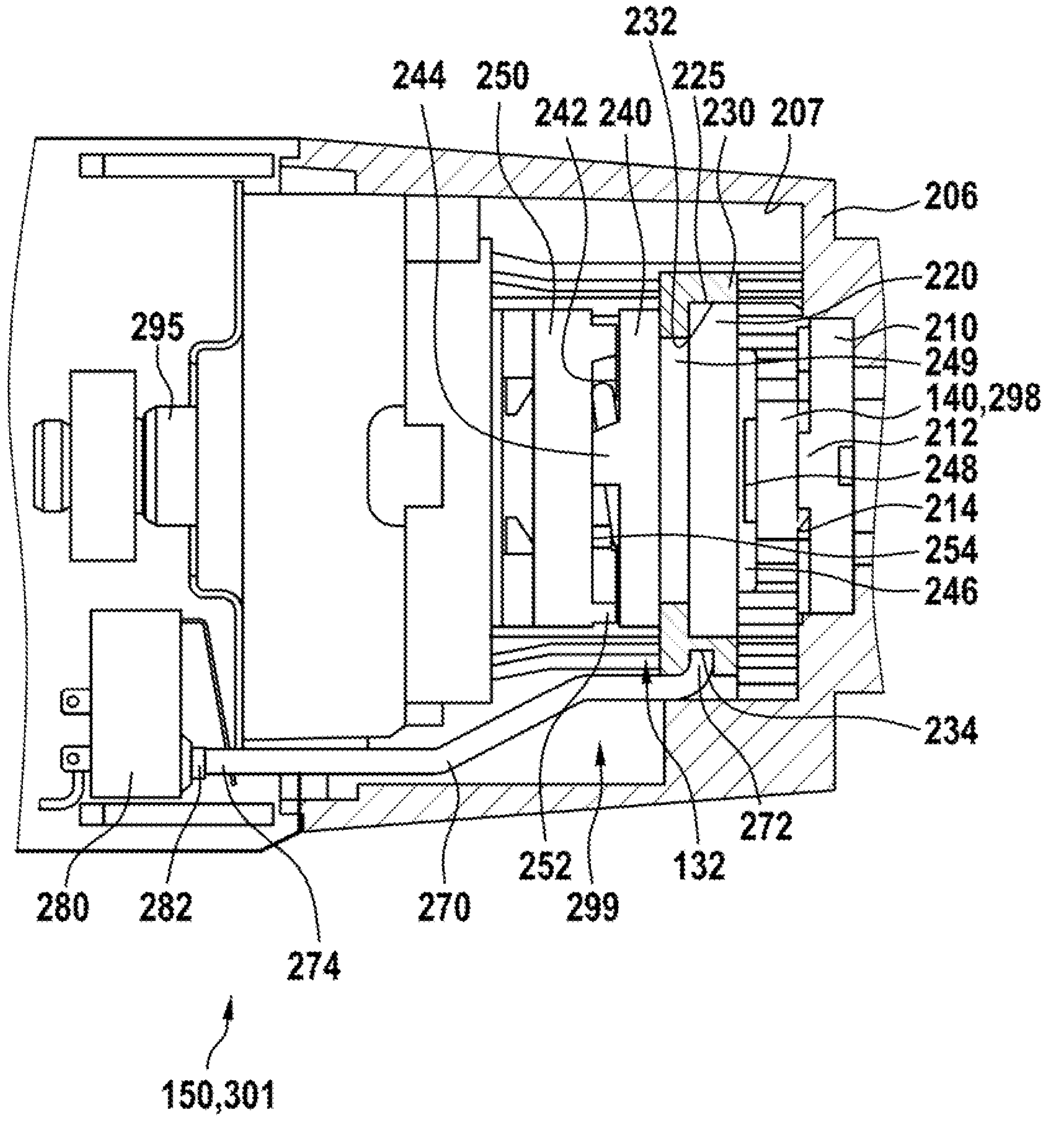
FIG. 4 shows an enlarged view of the auto-start unit from FIG. 2 with the clutch in a coupling position.

The first and second clutch part 240, 250 are preferably in engagement with one another in the coupling position (301 in FIG. 4). Here, the holder elements 252 of the second clutch part 250 are arranged in the holders 242 of the first clutch part 240, and the holder elements 244 of the first clutch part 240 are arranged in the holders 254 of the second clutch part 250. A rotary driving connection is configured as a result.

In the decoupling position 201 which is shown in FIG. 2, the two clutch parts 240, 250 are spaced apart from one another along the rotational axis 109. A spring element 260 is preferably arranged between the first and second clutch part 240, 250. The spring element 260 is configured to load the two clutch parts 240, 250 into the decoupling position 201. In the decoupling position 201, the output shaft 295 is arranged spaced apart from the tool holder 140. No rotary driving connection takes place here via the holder elements 244 and 252 to the tool holder 140.

In order to activate the drive motor 120 in the auto-start mode, the auto-start unit 150 is assigned an actuating rod 270. The actuating rod 270 can preferably be loaded against a motor switch 280. The motor switch 280 is arranged at an end of the auto-start unit 150, which end faces the drive motor 120 and faces away from the tool holder 140. The motor switch 280 is preferably arranged along the rotational axis 109 between the drive motor 120 and the clutch 132. In particular, the motor switch 280 is arranged between a fan impeller 290, optionally facing the drive motor 120, and the auto-start unit 150. For the actuation, the motor switch 280 has an actuating section 282.

The actuating rod 270 is preferably of rod-shaped configuration, and has an end 272 which faces the tool holder 140 and an end 274 which faces the motor switch 280. The actuating rod 270 is guided at least in regions along on the housing 110, in particular in the inner holder 207 of the transmission housing 206. Here, the actuating rod 270 is arranged in a clearance 299 which is configured perpendicularly with respect to the rotational axis 109 or in the radial direction 204 between the auto-start unit 150 or the clutch 130 and the transmission housing 206, that is to say the actuating rod 270 is arranged outside the tool holder 140 in the radial direction.

Within the context of the present description, the term "in regions" is understood to mean arranging or guiding at least in sections of the actuating rod 270 on the housing 110. In the present description, furthermore, the term "radial" or "in the radial direction" is to be understood to mean the direction 204 perpendicularly with respect to the longitudinal direction 103 of the housing 110, in particular perpendicularly with respect to the rotational axis 109 of the drive motor 120.

In the region of its ends 272, 274, in particular, the actuating rod 270 is preferably arranged on the housing 110 or the inner holder 207, with preference is guided on the latter. In the decoupling position 201 from FIG. 2, that end 274 of the actuating rod 270 which faces the motor switch 280 is arranged at a spacing 205 along the rotational axis 109 from the motor switch 280.

Furthermore, the auto-start unit 150 is preferably assigned a slide 230. The actuating rod 270 is preferably connected via the slide 230 to the tool holder 140. The slide 230 is preferably configured in the manner of an internal gear. The slide 230 is preferably arranged on an outer circumference 249 of the first clutch part 240. As described above, the first clutch part 240 is arranged on the tool holder 140 or the drive shaft 298 which is assigned to the tool holder 140. Furthermore, the slide 230 is preferably decoupled in terms of rotation from the tool holder 140 via a bearing element 220. For this purpose, the bearing element 220 is arranged in the radial direction 204 between the slide 230 and the first clutch part 240. Here, an outer circumference 225 of the bearing element 220 is arranged on an inner circumference 232 of the slide 230. As a result, a non-positive connection is preferably produced between the bearing element 220 and the slide 230.

The slide 230 preferably has a holder 234 for receiving that end 272 of the actuating rod 270 which faces the tool holder 140. The end 272 of the actuating rod 270 is preferably curved, with preference by 90°, in the radial direction 204 towards the slide 230. The holder 234 is preferably arranged on the outer circumference of the slide 230. Here, the holder 234 is configured as a groove, in which the end 272 can be arranged. A positively locking, non-positive and/or integrally joined connection is preferably configured between the end 272 of the actuating rod 270 and the holder 234. Moreover, the slide 230 has a collar 236 which is configured in the radial direction 204. The collar 236 is preferably configured as a rest element for the bearing element 220, with the result that the bearing element 220 and/or the slide 230 are/is secured on the first clutch part 240 along the longitudinal direction 103 towards the output shaft 295.

Moreover, by way of illustration, the slide 230 has a positioning web 239. The positioning web 239 is preferably configured as a widened portion in the radial direction 204. Here, the positioning web 239 is preferably configured to position the slide 230 in the housing 110 such that it cannot rotate. The positioning web 239 is preferably configured in the region of the holder 234. As a result, a secure and reliable arrangement of the end 272 of the actuating rod 270 in the holder 234 can be made possible. The end 272 is preferably arranged in the holder 234, and is held in position between the slide 230 and the inner holder 207.

At its end which lies opposite the holder 242, the first clutch part 240 analogously has groove-like holder regions 248 and holder sections 246. In the decoupling position 201, the holder sections 246 engage into groove-like holder regions 214 of a clutch disk 210, and the holder regions 248 engage into holder sections 212 of the clutch disk 210. The clutch disk 210 is configured to comparatively rapidly stop a rotation of the tool holder 140 in the decoupling position 201. The clutch disk 210 is preferably arranged fixedly on the housing.

By way of loading of the tool holder 140 against a workpiece to be worked on, the tool holder 140 is displaced in the direction of an arrow 202 towards the drive motor 120. Here, the two clutch parts 240, 250 are operatively connected, and the actuating rod 270 loads the motor switch 280, as a result of which the drive motor 120 is activated. Here, the actuating rod 270 at the same time moves via the movement of the slide 230 or of the first clutch part 240 in the axial direction.

In general, the auto-start unit 150 is preferably assigned the first clutch part 240, the actuating rod 270, the motor switch 280, the slide 230 and the bearing element 220.

Figure 3:
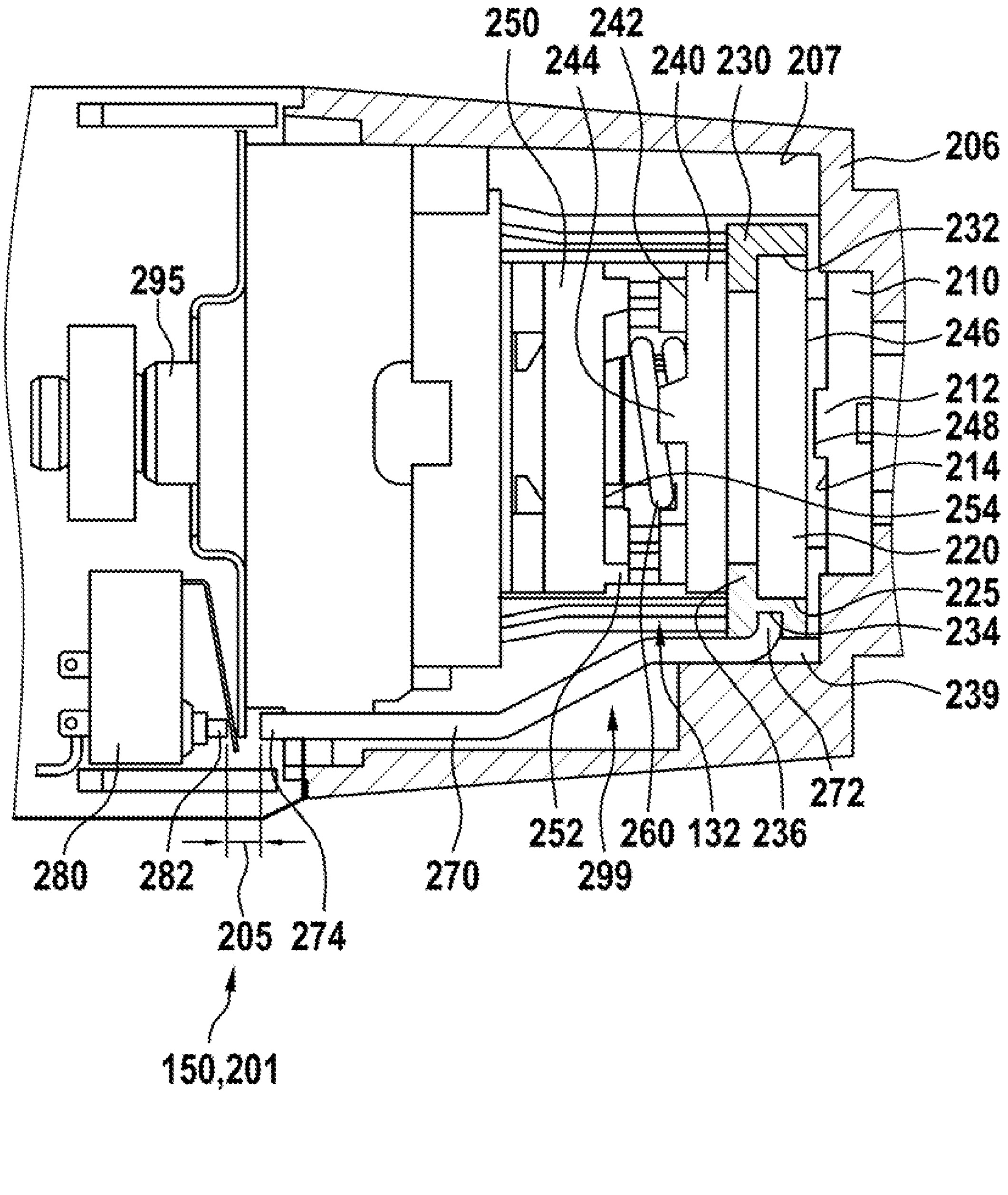
FIG. 3 shows an enlarged view of the auto-start unit with the clutch from FIG. 2.

FIG. 3 shows the auto-start unit 150, arranged in the transmission housing 206, in the decoupling position 201 from FIG. 2. Here, FIG. 3 illustrates the arrangement of the slide 230 with the bearing element 220 on the first clutch part 240. Furthermore, FIG. 3 shows the arrangement of the actuating rod 270 in the clearance 299. In particular, the arrangement of the end 272 of the actuating rod 270 in the holder 234 of the slide 230 is illustrated. Moreover, the positioning web 239 of the slide 230 is illustrated, which positioning web 239 is preferably arranged in the region of the holder 234.

FIG. 4 shows the auto-start unit 150, arranged in the transmission housing 206, from FIG. 2 in a coupling position 301, in which the drive motor 120 is activated. In the coupling position 301, the two clutch parts 240, 250 of the clutch 132 are operatively connected. Here, as described above, the holder elements 252 of the second clutch part 250 are arranged in the axial direction in the holders 242 of the first clutch part 240, and the holder elements 244 of the first clutch part 240 are arranged in the holders 254 of the second clutch part 250. As a result of the displacement of the first clutch part 240 along the rotational axis 109 towards the drive motor 120, the actuating rod 270 loads the motor switch 280, that is to say the spacing 205 from FIG. 2 and FIG. 3 is no longer present. Moreover, the first clutch part 240 is arranged spaced apart from the clutch disk 210.

Figure 5:
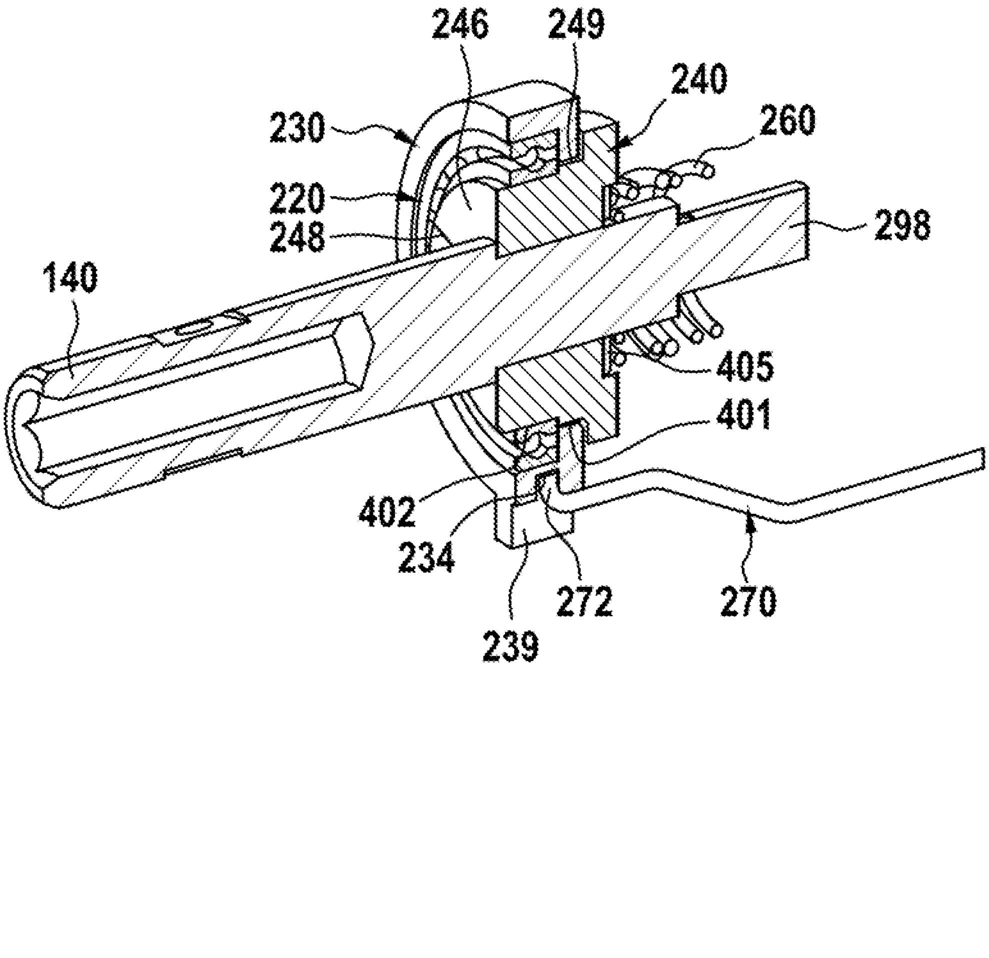
FIG. 5 shows a perspective view of the auto-start unit with a clutch part of the clutch from FIG. 2 to FIG. 4.

FIG. 5 shows the tool holder 140 with the first clutch part 240, the slide 230 and the actuating rod 270 from FIG. 2 to FIG. 4. Here, FIG. 5 illustrates the arrangement of the first clutch part 240 on the tool holder 140 or the drive shaft 298. As described above, the slide 230 and the bearing element 220 are arranged on the outer circumference 249 of the first clutch part 240. Here, the bearing element 220 is arranged on a first section 401 and the slide 230 is arranged on a second section 402 of the outer circumference 249 of the first clutch part 240. The first section 401 preferably has a greater diameter than the second section 402. Moreover, the first section 401 is arranged directed away from the tool holder 140, and the second section 402 is arranged so as to face the tool holder 140. The two sections 401, 402 are preferably of circumferential configuration.

The spring element 260 is preferably arranged on a central region 405, or on a region of the first clutch part 240, which region faces away from the tool holder 140. Here, by way of illustration, the spring element 260 is positioned on the outer circumference of the drive shaft 298. The spring element 260 is preferably configured as a spiral spring.

Moreover, FIG. 5 illustrates the positioning web 239 of the slide 230. As described above, the positioning web 239 is preferably configured as a radial widened portion. The positioning web 239 is preferably configured in one piece with the slide 230, but can also be fastened to the slide 230 via any desired connection, for example an adhesive bond.

It is noted that the actuating rod 270 can also be configured in one piece with the slide 230. It is noted, furthermore, that the motor switch 280 is preferably configured as a switching element, in particular as a pressure switch or pushbutton. As an alternative to this, the motor switch 280 and the actuating rod 270 can be configured, for example, as contact elements which can make contact with one another and, in the case of contact with one another, configure an electrical connection to the drive motor 120 or make a power supply of the drive motor 120 possible.

What is claimed is:

1. A hand-held power tool, comprising:

a tool holder;

a housing in which a drive motor configured to drive an output shaft is arranged, the output shaft arranged spaced apart from the tool holder in a decoupling position of the tool holder;

a clutch configured to operatively connect the output shaft to the tool holder in a coupling position of the tool holder by way of a loading of the tool holder along a rotational axis of the drive motor against a workpiece to be worked on; and an actuating rod configured to be loaded against a motor switch in the coupling position to activate the drive motor, the motor switch arranged along the rotational axis of the drive motor between the drive motor and the clutch, wherein the actuating rod is guided by the housing at least in regions by direct contact of the actuating rod with the housing.

2. The hand-held power tool according to claim 1, wherein the actuating rod is connected via a slide to the tool holder.

3. The hand-held power tool according to claim 2, wherein the slide is decoupled in terms of rotation from the tool holder via a bearing element.

4. The hand-held power tool according to claim 2, wherein the slide has a holder configured to receive an end of the actuating rod, which end faces the tool holder.

5. The hand-held power tool according to claim 2, wherein the slide has a positioning web, the positioning web configured to position the slide in the housing such that the slide cannot rotate.

6. The hand-held power tool according to claim 1, wherein:

the clutch has a first clutch part which is connected to the tool holder and a second clutch part which is connected to the output shaft, the first and second clutch part are in engagement with one another in the coupling position; and the first and second clutch part are spaced apart from one another along the rotational axis of the drive motor in the decoupling position.

7. The hand-held power tool according to claim 6, further comprising:

a slide connecting the actuating rod to the tool holder, wherein the slide is arranged on an outer circumference of the first clutch part.

8. The hand-held power tool according to claim 1, wherein an end of the actuating rod facing the motor switch is spaced apart from the motor switch in the decoupling position, and activates the motor switch by way of force loading in the coupling position.

9. The hand-held power tool according to claim 1, wherein the clutch is configured as a separating clutch.

10. The hand-held power tool according to claim 9, wherein the separating clutch is configured as a dog clutch.

11. The hand-held power tool of claim 1, wherein the hand-held power tool is a screwdriver.

12. A method for activating a drive motor of a hand-held power tool according to claim 1, the clutch comprising a first clutch part of the output shaft and a second clutch part of the tool holder, comprising:

activating a first operating element of the hand-held power tool;

activating an auto-start mode via a second operating element of an auto-start unit of the hand-held power tool; and loading the tool holder of the hand-held power tool against a workpiece to be worked on, such that the first clutch part of the output shaft is operatively connected to the second clutch part of the tool holder by way of a movement along the rotational axis of the drive motor, such that the actuating rod is displaced along the rotational axis of the drive motor and activates the motor switch.

13. A hand-held power tool, comprising:

a tool holder;

a housing in which a drive motor configured to drive an output shaft is arranged, the output shaft arranged spaced apart from the tool holder in a decoupling position of the tool holder;

a clutch configured to operatively connect the output shaft to the tool holder in a coupling position of the tool holder by way of a loading of the tool holder along a rotational axis of the drive motor against a workpiece to be worked on;

an actuating rod configured to be loaded against a motor switch in the coupling position to activate the drive motor, the motor switch arranged along the rotational axis of the drive motor between the drive motor and the clutch, wherein the actuating rod is guided by the housing at least in regions; and a slide connecting the actuating rod to the tool holder, wherein, the clutch has a first clutch part which is connected to the tool holder and a second clutch part which is connected to the output shaft, the first and second clutch part are in engagement with one another in the coupling position, the first and second clutch part are spaced apart from one another along the rotational axis of the drive motor in the decoupling position, and the slide is arranged on an outer circumference of the first clutch part.

14. A method for activating a drive motor of a hand-held power tool including a tool holder, a housing in which a drive motor configured to drive an output shaft is arranged, the output shaft arranged spaced apart from the tool holder in a decoupling position of the tool holder, a clutch configured to operatively connect the output shaft to the tool holder in a coupling position of the tool holder by way of a loading of the tool holder along a rotational axis of the drive motor against a workpiece to be worked on, and an actuating rod configured to be loaded against a motor switch in the coupling position to activate the drive motor, the motor switch arranged along the rotational axis of the drive motor between the drive motor and the clutch, wherein the actuating rod is guided by the housing at least in regions, the clutch comprising a first clutch part of the output shaft and a second clutch part of the tool holder, the method comprising:

activating a first operating element of the hand-held power tool;

activating an auto-start mode via a second operating element of an auto-start unit of the hand-held power tool; and loading the tool holder of the hand-held power tool against a workpiece to be worked on, such that the first clutch part of the output shaft is operatively connected to the second clutch part of the tool holder by way of a movement along the rotational axis of the drive motor, such that the actuating rod is displaced along the rotational axis of the drive motor and activates the motor switch.

* * * * *